United States Patent [19]

Suzuki et al.

[11] 3,767,526

[45] Oct. 23, 1973

[54] METHOD FOR INCREASING YIELD OF SUCROSE

[75] Inventors: Hideo Suzuki; Harumi Yoshida; Yoshiko Ozawa; Akira Kamibayashi, all of Chiba; Munetaka Sato, Tokyo; Atsushi Mori; Makoto Endo, both of Hokkaido, all of Japan

[73] Assignees: Agency of Industrial Science & Technology; Hokkaido Co., Ltd., Tokyo, Japan

[22] Filed: Dec. 6, 1971

[21] Appl. No.: 205,296

[52] U.S. Cl................ 195/11, 127/46 R, 127/46 A
[51] Int. Cl......... C12b 1/00, C13j 1/02, C13j 1/06
[58] Field of Search................ 127/46 R, 46 A; 195/11

[56] References Cited
UNITED STATES PATENTS

| | | | |
|---|---|---|---|
| 3,647,625 | 3/1972 | Suzuki et al. | 195/11 |
| 2,413,844 | 1/1947 | Rawlings | 127/46 A |
| 2,911,329 | 11/1959 | Blann | 127/46 R |

OTHER PUBLICATIONS

Chemical Abstracts: 63: 15504f (1965).
"Beet-Sugar Technology," R. A. McGinnis, ed., 2nd Edition, 42–43, Beet Sugar Development Foundation, Colorado, 1971.

*Primary Examiner*—Morris O. Wolk
*Assistant Examiner*—Sidney Marantz
*Attorney*—Kurt Kelman

[57] ABSTRACT

In a method for producing sucrose from beets through a deionization treatment using ion-exchange resins, increasing the yield of sucrose by recovering sucrose from the molasses which is separated from sucrose when the massecuite resulting from the sugar-boiling process is subjected to centrifugal separation. Sucrose is recovered from the molasses by (i) allowing α-galactosidase to act upon the separated molasses thereby hydrolyzing the raffinose contained therein into sucrose and galactose and returning the resultant hydrolyzate to the purification process which includes the treatment of deionizing fresh diffusion juice with an ion-exchange resin, (ii) hydrolyzing the separated molasses into sucrose and raffinose with α-galactosidase, deionizing the resultant hydrolyzate with an ion-exchange resins, and thereafter returning the deionized hydrolyzate to the purification process in which fresh diffusion juice is treated, or (iii) deionizing the separated molasses with an ion-exchange resins, subsequently hydrolyzing the raffinose contained therein into sucrose and galactose with α-galactosidase, and thereafter returning the resulting hydrolyzate to the purification process in which fresh diffusion juice is treated; whereby the hydrolyzate is treated in the sugar-boiling process to effect recovery of sucrose contained therein. The molasses further separated centrifugally is treated again with α-galactosidase and returned to the purification process in which fresh diffusion juice is treated.

6 Claims, No Drawings

METHOD FOR INCREASING YIELD OF SUCROSE

This invention relates to a method for increasing the yield of sucrose in the production of sucrose from beets.

In recovering sucrose from the beet sugar solution, the recovery is impeded predominantly because of the behavior of the impurities and the raffinose which are contained in the sugar solution. When ash, soluble nitrogen compounds and other impurities accumulate in the sugar solution, they obstruct eduction of normal sucrose crystals. The raffinose, if allowed to accumulate, not merely impedes the growth of sucrose crystals but causes sucrose crystals to assume an extremely needly shape, rendering the centrifugal separation of massecuite difficult.

The deionization processes using ion-exchange resins suggested to date for the purification of sugar solution extracted from beets (hereinafter referres as "diffusion juice") include the Imacti process, the modified Imacti process, the Nitten-Organo process, and so forth. Although these processes differ slightly from one another in the manner of passage of the solution and in the combination of resins, they are invariably directed to increasing the yield of sucrose by depriving the sugar solution of impurities and heightening the purity thereof. With these processes, however, it is difficult to effect thorough removal of impurities so that the sugar solution contains a small proportion of residual impurities. As the treatment of sugar-boiling is repeated in the sugar-boiling process, impurities are gradually accumulated in the molasses.

In the aforesaid deionization processes using ion-exchange resins, raffinose cannot be removed. In the stage in which the diffusion juice is purified, the removal of raffinose cannot be effected either by the lime treatment (liming), carbonation treatment or sulfitation treatment given prior to the deionization treatment using ion-exchange resins. If the sugar-boiling treatment is repeated, the good majority of the raffinose accumulates in the molasses and only a very little of the raffinose adheres to sucrose crystals and is recovered as part of the sugar product. At times, the accumulation of raffinose is so great that the raffinose content reaches 5 to 10 percent or even over 10 percent, rendering the centrifugal separation of massecuite difficult.

The molasses which no longer permits ready recovery of sucrose because of such accumulation of impurities and raffinose is discharged as waste molasses from the production system, despite the fact that it still contains sucrose by 50 – 60 percent. The waste molasses thus discharged is used as the raw material for alcoholic products or animal food.

There are known processes, such as the BMA process, for manufacturing ion sugar or liquid sugar of inferior quality by means of deionization treatment using ion-exchange resins from molasses which, having passed through the sugar-boiling process, contains such as accumulation of impurities and raffinose as to make recovery of further sucrose difficult. However, no method is known for recovering high quality sucrose from such molasses. Such is the present state of affairs.

It is desirable that the molasses obtained by the centrifugal separation of massecuite should be returned to be repurified in the process in which fresh diffusion juice undergoes purification treatment. With the processes so far suggested, however, the raffinose escapes being removed and is circulated through the stage of purification back to the stage of sugar-boiling. Thus, the accumulation of raffinose gradually proceeds to impede normal crystallization of sucrose, render the centrifugal separation of massecuite difficult, decrease the efficiency of production facilities, and degrade the quality of the final sugar product.

It is the main object of this invention to provide a method for increasing the yield of sucrose by overcoming the various drawbacks which are involved in the production of sucrose from beets by the conventional processes.

The inventors formerly proposed a method whereby $\alpha$-galactosidase is produced from a mold and allowed to act upon the beet sugar solution so that the raffinose contained in this solution is effectively hydrolyzed into sucrose and galactose (U.S. Ser. No. 710,679 now U.S. Pat. No. 3,647,625). They further carried out a study in search for a method which would increase the yield of sucrose by combining the said method for the hydrolysis of raffinose with the method for the production of sucrose from beets. Consequently, they have made the discovery that, in a method for producing sucrose from beets through the deionization treatment using ion-exchange resins, the raffinose which impedes the crystallization of sucrose can be hydrolyzed and the yield of sucrose increased proportionally by separating the massecuite resulting from the sugar-boiling process into sucrose and molasses through the treatment of centrifugal separation, allowing $\alpha$-galactosidase to act upon the separated molasses thereby hydrolyzing the raffinose contained therein into sucrose and galactose, returning the resultant hydrolyzate to the process in which the fresh diffusion juice is purified, and once again concentrating and boiling the hydrolyzate together with the freshly supplied diffusion juice so as to recover sucrose therefrom.

The term "massecuite" as used in this specification means the mixture of sucrose crystals and mother liquor which is obtained in the sugar-boiling process, the term "molasses" means the sugar solution which remains after removal of the sucrose crystals from the massecuite, the term "process of centrifugal separation" means a process in which the massecuite is separated into sucrose crystals and molasses, the term "ion sugar" means the molasses-containing sugar obtained by concentrating and drying in a vacuum evaporator molasses which has been subjected to the deionization treatment using ion-exchange resins, and the term "liquid sugar" means the sugar solution containing no sucrose crystals which is obtained by concentrating in a vacuum evaporator molasses which has been subjected to the deionization treatment using ion-exchange resins.

The diffusion juice undergoes the lime treatment (liming) and the carbonation treatment first in the process of purification. It is additionally subjected, if occasion demands, to the sulfitation treatment and/or calcium removing treatment using ion-exchange resins for further removal of impurities. The diffusion juice which has thus been deprived of impurities is then treated by either of two procedures. In one procedure, the juice is deionized with ion-exchange resins for removal of ash, soluble nitrogen compounds and other impurities entrained therein, and thereafter concentrated, and boiled several times in the sugar-boiling process. In the other procedure, the juice is concentrated immediately, without going through the deionization treatment using ion-exchange resins, and boiled several times in the sugar-boiling process, and the molasses separated in the final sugar-boiling process is deionized by means of ion-exchange resins. The molasses which has been separated through the final sugar-boiling process in either of the procedures mentioned above still contains sucrose by more than 50 percent. However, it is difficult to effect economic recovery of the remaining sucrose from this molasses because the molasses now contains accumulated raffinose by nearly 5 to 10 percent or more. The molasses is discharged as a waste molasses from the production system and then used as the raw material for animal feed or low-grade ion sugar or liquid sugar.

The present invention aims to recover sucrose from the molasses from which sucrose can no longer be recovered economically by conventional processes. It accomplishes the recovery by allowing α-galactosidase to act upon the molasses thereby hydrolyzing the raffinose contained therein into sucrose and galactose and then returning the resultant hydrolyzate to the process in which the fresh diffusion juice is purified. In order for the α-galactosidase to act sufficiently upon the molasses, the enzyme is added after the molasses has been diluted to an appropriate concentration (20° – 60° Brix). In selecting α-galactosidase for this purpose, the method by which it is produced does not matter. Preferably, there is selected an α-galactosidase of a type having low invertase activity. In the case of an α-galactosidase having high invertase activity, it is inactivated as required before it is put to use. Examples are α-galactosidases extracted from such plant seeds as coffee bean, Vicia sativa, and Vicia faba and α-galactosidases produced from such microorganisms as Brewer's yeast, Aspergillus oryzae, Aspergillus niger, Penicillium paxilli, Calvatia cyathiformis, Mortierella vinacea var. raffinoseutilizer, Streptomyces olivaceus var. raffinoseutilizer, Streptomyces fradiae, Streptomyces roseospinus, E. coli, Aerobacter aerogenes, Streptococcus bovis, Bacillus Delbruckii, Bacillus circulans, and Pseudomonas eisenbergii. Of these enzymes, most suitable is one obtained by culturing Mortierella vinacea var. raffinose utilizer (ATCC 20034).

The molasses to be acted upon by the enzyme may be any of the molasses which are obtained at the various stages of the sugar-boiling process, namely, from the initial to the final stages of the process. If occasion demands, molasses from different stages may be subjected to the action of this enzyme alone or in suitable combinations.

The hydrolysis ratio of raffinose by α-galactosidase is variable with the concentration of molasses, the activity of the enzyme (α-galactosidase) per raffinose, and the duration and temperature selected for the action of the enzyme. Generally, this hydrolysis ratio increases in inverse proportion to the concentration of molasses and in direct proportion to the activity of the enzyme and the duration and temperature selected for the enzymatic action. At temperatures exceeding the level of 65° C, however, the enzyme is inactivated. When the molasses concentration exceeds 65° Brix, the hydrolysis ratio is lowered to the extent of making the operation unprofitable. To be more specific, 50 to 90 percent of the raffinose contained in the molasses can be hydrolyzed when α-galactosidase is allowed to act for a period of 2 to 3 hours on the molasses in relative amounts such as to give a ratio of 2,500,000 to 5,500,000 units of the enzyme to one gram of the raffinose, with the concentration of molasses fixed in the range of from 20° to 60° Brix, the pH value in the range of from 5.0 to 5.2, and the temperature in the range of from 45° to 55° C. (The unity of the activity of α-galactosidase is fixed to be such that will produce 1 μg of free glucose after the enzyme has been left to act for 2 hours on melibiose having a final concentration of 0.015 mole at 40° C and pH 5.2.)

The molasses which has had its raffinose hydrolyzed as mentioned above (hereinafter referred to as "raffinose-hydrolyzed molasses") is, if necessary subsequent to separation of the enzyme therefrom, returned to the purification process in which fresh diffusion juice is treated. Thereafter, it is forwarded through the concentration process, sugar-boiling process and centrifugal separation process to effect the separation of sucrose. The molasses which is consequently separated from sucrose is again acted upon by α-galactosidase so that the raffinose contained therein is hydrolyzed into sucrose and galactose.

If the purification process to which the raffinose-hydrolyzed molasses is returned comprises a carbonation process, a sulfitation process and deionization process using ion-exchange resins, for example, the molasses must be returned at least to the deionization process using ion-exchange resins. In the carbonation process, galactose is decomposed into organic acids etc.. In the case the galactose content of the molasses is increased, therefore, better results are obtained by first returning the molasses to the carbonation process and thereafter subjecting it to the deionization process using ion-exchange resins. In a sucrose manufacturing operation which involves the deionization process using ion-exchange resins subsequent to the sugar-boiling process, the molasses may be subjected to the deionization process using ion-exchange resins immediately before or after the process for hydrolyzing the raffinose content of the molasses and thereafter returning the molasses to the process for purifying the fresh diffusion juice.

The process for purifying the diffusion juice normally comprises the liming process, the carbonation process, the sulfitation process (performed optionally), and the calcium removing process using ion-exchange resins (performed optionally; if performed, it may precede the sulfitation process) and the molasses which has already undergone the raffinose hydrolyzing process and the deionization process using ion-exchange resins can be returned to any one of the these processes.

The dionization process involves a basic procedure which comprises the steps of cooling the sugar solution in advance to 5° to 25° C and sending the solution first through a column of a strongly acidic cation-exchange resin (such as Amberlite IR-120B) of H type and subsequently through a column of a moderately-basic or weakly-basic anion-exchange resin (such as Amberlite IRA-68) of OH type or first through a column of a weakly-acidic cation-exchange resin of H type and subsequently through a column of a strongly-basic, weakly-basic or moderately-basic anion-exchange resin of OH type. Generally, this deionization treatment heightens the sugar purity 4 – 6 percent.

After the raffinose in the molasses has been hydrolyzed into sucrose and galactose the hydrolyzed molasses is either returned to the process for purifying the fresh diffusion juice directly or after being subjected to the deionization process using ion-exchange resins. As there is no accumulation of raffinose resulting from the repeated extraction in the boiling process of sucrose from the hydrolyzed molasses which has been returned to the purification process, the crystallization of sucrose is consequently not impeded and it is therefore possible to increase the yield of sucrose.

The effect brought about when the molasses obtained from the centrifugal separation of massecuite is subjected to the raffinose hydrolyzing process and subsequently deionized with ion-exchange resins is not substantially different from the effect produced when the same molasses is first deionized with ion-exchange resins and subsequently subjected to the raffinose hydrolyzing process. In the latter case, the invert sugar (particularly, glucose) produced during the deionization process using ion-exchange resins impedes the activity of $\alpha$-galactosidase. Because of this activity of invert sugar, the hydrolysis ratio of raffinose is slightly lower than when the molasses is treated in the first mentioned sequence. Accordingly, the first mentioned sequence is more desirable.

For example, a molasses having sucrose purity of 84.39 percent and raffinose content of 5.89 percent on Brix was obtained through the purification process which included the deionization process using ion-exchange resins. This was adjusted to 30° Brix, 50° C and pH 5.0. To the molasses, $\alpha$-galactosidase was added at the rate of 3,500,000 units per gram of raffinose and allowed to act on the molasses for 2.5 hours to effect the hydrolysis of the raffinose content (hydrolysis ratio 72.7 percent). The raffinose-hydrolyzed molasses, 13° Brix and 5° C, was sent through a column of Amberlite IR-120B (H type) and a column of Amberlite IRA-68(OH type). The results obtained consequently are shown in Table 1 below.

TABLE 1

| | Sucrose purity (%) | Raffinose (% on Brix) |
|---|---|---|
| Molasses | 84.39 | 5.89 |
| Raffinose-hydrolyzed molasses | 86.97 | 1.61 |
| Molasses deionized with ion-exchange resins | 92.56 | 1.59 |

This improvement in the surcrose purity is ascribed to the fact that the raffinose had been hydrolyzed and sucrose formed consequently and the impurities had been removed by the deionization process using ion-exchange resins.

The recovery of sucrose is facilitated when the raffinose content is decreased and the purity is heightened by hydrolyzing the raffinose in the molasses by use of $\alpha$-galactosidase and removing the impurities by the deionization process using ion-exchange resins.

The data given in Table 1 indicate that the percentage of sucrose recovered from the molasses is 74.72 percent based on the sucrose content in the molasses where the molasses is not treated by the method of this invention. If the method thereof is used, the percentage is increased by 14.33 percent to 89.05 percent. Thus, the difference in yield is 14.33 percent. (The percentage of recovered sucrose has been calculated in accordance with the formula given on page 31 of the "Handbook for Manufacture of Sugar" (compiled by Sugar Refining Technique Research Group of Japan Sugar Refining Industry Association), while fixing the purity of product sugar at 99.95 percent and that of final molasses at 57.80 percent).

Cited above is an example in which the raffinose-hydrolyzed molasses was deionized by using ion-exchange resins. If the raffinose-hydrolyzed molasses is returned to be carbonated in the carbonation process which precedes the deionization process using ion-exchange resins, the purity is further improved by 1 to 2 percent and the invert sugar, galactose, which causes coloration during the sugar-boiling process and impedes normal crystallization of sucrose is decomposed into organic acids, etc. Thus, the present procedure is advantageous. Galactose is formed in consequence of the hydrolysis of raffinose which occurs during the raffinose hydrolyzing process. If the galactose is left to accumulate, it impedes the raffinose hydrolyzing activity of $\alpha$-galactosidase. Where the accumulation of galactose occurs heavily, it is desirable for the raffinose-hydrolyzed molasses to be returned to a process preceding the carbonation process or more preferably to the carbonation process itself.

According to this invention, the molasses obtained from the centrifugal separation of massecuite is treated with $\alpha$-galactosidase to effect the hydrolysis of raffinose therein. Then, the raffinose-hydrolyzed molasses is returned a process preceding the deionization process so as to be deionized subsequently. As a result, the sucrose purity of molasses increases from 84.39 to 92.56 percent and the raffinose content decreases 5.89 percent on Brix to 1.59 percent on Brix. The purity of sucrose is improved markedly and the recovery of sucrose by crystallization is facilitated. The ratio of sucrose recovery from this molasses is improved by 14.33 percent over that which is obtained without practicing the method of this invention. Thus, the amount of sucrose to be recovered is increased proportionally.

Further, a molasses having sucrose purity of 84.2 percent and a raffinose content of 6.2 percenct on Brix which was not treated with the deionization process using ion-exchange resins in the purification process was adjusted to 30° Brix and pH 5.0. To the molasses, $\alpha$-galactosidase was added at the rate of 3,500,000 units per gram of raffinose and allowed to act upon the molasses for 2.5 hours to effect the hydrolysis of raffinose. Then, the hydrolyzed molasses was sent first through a column of Amberlite IR-120B (H type) and then through a column of Amberlite IRA-68 (OH type) at 5° C. It was carbonated with milk of lime added thereto by 2 percent on Brix as CaO. The results consequently obtained are shown in Table 2.

TABLE 2

| | Sucrose purity (%) | Raffinose (% on Brix) | Invert sugar (% on Brix) | S.C.V. |
|---|---|---|---|---|
| Molasses | 84.2 | 6.20 | 0.95 | 32 |
| Raffinose-hydrolyzed molasses | 86.9 | 1.90 | 1.65 | 41 |
| Molasses deionized with ion-exchange resins | 90.7 | 1.85 | 1.90 | 9 |
| Carbonated sugar solution | 93.0 | 1.90 | 0.35 | 5 |

(Remarks) S.C.V. = Stammer color value determined by the method adopted in the sugar refining industry. It is measured with a Stammer colorimeter.

As is evident from the foregoing table, the increase in sucrose purity, the decrease in raffinose and invert sugar, the decrease in Stammer color value, etc. serve to facilitate the recovery of sucrose in the sugar-boiling process and improve the quality of product sugar. The improvement in sucrose purity implies that the raffinose was hydrolyzed into sucrose and that impurities were removed during the deionization process using ion-exchange resins and the carbonation process.

The same molasses was subjected under the same conditions as mentioned above to the deionization process using ion-exchange resins and to the carbonation process, with the raffinose hydrolyzing process left out. Table 3 below shows the composition of the molasses determined at the indicated stages of treatment.

TABLE 3

|  | Sucrose purity (%) | Raffinose (% on Brix) | Invert sugar (% on Brix) | S.C.V. |
| --- | --- | --- | --- | --- |
| Molasses | 84.2 | 6.20 | 0.95 | 32 |
| Molasses deionized with ion-exchange resins | 88.2 | 6.30 | 1.40 | 7 |
| Carbonated sugar solution | 90.9 | 6.30 | 0.50 | 5 |

In the operation excluding the raffinose hydrolyzing process, the sucrose purity was increased only by a slight degree and the raffinose content was not decreased at all. Consequently, normal crystallization of sucrose was impeded when the molasses was treated in the sugar-boiling process.

Cited above is an example in which the molasses which had undergone the raffinose hydrolyzing process was deionized with ion-exchange resins and subsequently returned to the carbonation process. It is otherwise permissible for the molasses to be returned to the purification process that comes after the carbonation process.

As is stated above, this increase in the yield of sucrose by the execution of this invention is due to the fact that the residual sucrose in the molasses can be recovered by such multipliable effects as that it has become possible to return the molasses to the process for purifying the fresh diffusion juice through the hydrolysis of raffinose and further that the purity of sugar is improved in the deionization process by using ion exchange resins and in the process for purifying the fresh diffusion juice, and that the sugar-boiling efficiency and the centrifugal separating efficiency are improved, and that the sucrose in the molasses is increased through the hydrolysis of raffinose.

The present invention is described more specifically with reference to preferred embodiments cited hereinafter not by way of limitation of invention but by way of illustration.

EXAMPLE 1

As the source of α-galactosidase, there were used cells containing α-galactosidase (hereinafter referred to as "enzyme-containing cells") obtained by inoculating a culture medium containing 1 percent of lactose, 1 percent of corn steep liquor, 0.1 percent of ammonium sulfate, 0.1 percent of urea, 0.2 percent of sodium chloride, 0.2 percent of magnesium sulfate, 0.3 percent potassium primary phosphate, and 1 percent of calcium carbonate with Mortierella vinacea var. raffinose-utilizer and aerobically culturing the microbe therein at 30° C for 3 days. The molasses selected for the hydrolysis was the fourth molasses obtained in a beet sugar production plant using ion-exchange resins deionization process prior to the sugar-boiling process. Table 4 given below shows a composition of this molasses.

TABLE 4

| Brix concentration | 74.5° Brix |
| --- | --- |
| Sucrose concentration | 55.7% |
| Raffinose concentration | 5.13% |
| Sucrose purity | 74.8% |

700g of the molasses of the aforesaid composition was diluted with water to 30° Brix scale and adjusted to pH 5.2 with sulfuric acid. To this molasses, the enzyme-containing cells (having 600,000 units of α-galactosidase potency per gram) were added in an amount such as to give 4,500,000 units of α-galactosidase potency per gram of raffinose. The mixture was agitated at 50° C for 2.5 hours to allow the enzyme to act upon the raffinose in the molasses. At the end of the agitation, the hydrolysis ratio of raffinose was found to have reached 65.5 percent. When the mixture was filtered to remove the enzyme-containing cells therefrom, there was obtained 1.738g of raffinose-hydrolyzed molasses. The composition of this molasses is shown in Table 5 below.

TABLE 5

| Brix concentration | 30.0° Brix |
| --- | --- |
| Sucrose concentration | 23.3% |
| Raffinose concentration | 0.72% |
| Sucrose purity | 77.7% |

When the entire raffinose-hydrolyzed molasses was mixed with 21,000g of diffusion juice having a composition as shown in Table 6 below, the mixed sugar solution was found to have acquired the composition shown in Table 7.

TABLE 6

| Brix concentration | 15.5° Brix |
| --- | --- |
| Sucrose concentration | 13.8% |
| Raffinose concentration | 0.14% |
| Sucrose purity | 89.0% |

TABLE 7

| Brix concentration | 16.6° Brix |
| --- | --- |
| Surcrose concentration | 14.5% |
| Raffinose concentration | 0.18% |
| Sucrose purity | 87.3% |

This mixed sugar solution, with 2 percent on Brix of quick lime added thereto, was carbonated to pH 9.2 at 80° C. By filtering this sugar solution, there was obtained 25,093g of sugar solution which was found to have the composition shown in Table 8 below.

TABLE 8

| Brix concentration | 14.8° Brix |
| --- | --- |
| Sucrose concentration | 13.1% |
| Raffinose concentration | 0.17% |
| Sucrose purity | 88.5% |

The entire sugar solution thus obtained was passed through a column of Amberlite IR-120B (H type) at 5° C and then through a column of Amberlite IRA-68 (OH type).

The resultant deionized sugar solution was found to have a composition as shown in Table 9 below.

TABLE 9

| Brix concentration | 13.5° Brix |
| --- | --- |
| Sucrose concentration | 12.7% |
| Raffinose concentration | 0.16% |
| Sucrose purity | 94.1% |

The entire sugar solution (25,233g) thus obtained was concentrated and then subjected to five stages of sugar-boiling process. Consequently, there was recovered 2,929g of sucrose.

When 21,000g of the diffusion juice was carbonated under the same conditions as mentioned above and deionized with the ion-exchange resins, the resultant sugar solution was found to have a composition given in Table 10. By concentrating this sugar solution and subjecting it to five stages of sugar-boiling process, there was recovered 2,650g of sucrose. By boiling 700g of the fourth molasses, there was recovered 210g of sucrose.

TABLE 10

| | |
|---|---|
| Brix concentration | 12.4° Brix |
| Sucrose concentration | 11.9% |
| Raffinose concentration | 0.12% |
| Sucrose purity | 96.0% |

The foregoing results indicate that the yield of sucrose could be increased by 69g when 700g of fourth molasses was acted upon by $\alpha$-galactosidase to have the raffinose therein hydrolyzed and then the hydrolyzed molasses was returned to a process preceding the carbonation process.

This increase of sucrose yield is noted to far exceed 16.0g of sucrose which was formed in consequency of the hydrolysis of raffinose by $\alpha$-galactosidase.

Example 2

The same enzyme-containing cells, molasses, and diffusion juice as used in Example 1 were used.

700g of the molasses was diluted with water to 30° Brix and adjusted to pH 5.2 with sulfuric acid.

To the molasses thus prepared, the enzyme-containing cells (having 600,000 units of $\alpha$-galactosidase potency per gram) were added in an amount such as to give 4,500,000 units of $\alpha$-galactosidase potency per gram of raffinose. The mixture was agitated at 50° C for 2.5 hours to allow the enzyme to act upon the raffinose contained in the molasses. At the end of the agitation, the hydrolysis ratio of raffinose was found to be 65.5 percent. When the mixture was filtered to remove the enzyme-containing cells therefrom, there was obtained 1,738g of raffinose-hydrolyzed molasses having a composition shown in Table 5. The entire raffinose-hydrolyzed molasses was mixed with 23,068g of the filtered sugar solution (having the same composition as shown in Table 11) which had been obtained by carbonating 21,000g of diffusion juice having the composition of Table 6 by the same procedure as described in Example 1. The resultant mixed sugar solution was found to have a composition as given in Table 12.

TABLE 11

| | |
|---|---|
| Brix concentration | 13.9° Brix |
| Sucrose concentration | 12.5% |
| Raffinose concentration | 0.13% |
| Sucrose purity | 89.9% |

TABLE 12

| | |
|---|---|
| Brix concentration | 15.0° Brix |
| Sucrose concentration | 13.3% |
| Raffinose concentration | 0.17% |
| Sucrose purity | 88.7% |

The entire mixed sugar solution (24,806g) was passed through a column of Amberlite IR-120B (H type) at 5° C and then through a column of Amberlite IRA-68 (OH type).

The sugar solution obtained consequently was found to have a composition as shown in Table 13 below.

TABLE 13

| | |
|---|---|
| Brix concentration | 13.7° Brix |
| Sucrose concentration | 12.8% |
| Raffinose concentration | 0.16% |
| Sucrose purity | 93.4% |

By concentrating the entire sugar solution (25,052g) and subjecting it to five stages of boiling process, there was recovered 2,896g of sucrose.

When 21,000g of diffusion juice alone was carbonated and deionized by following the procedure of Example 1 and the resultant sugar solution was concentrated and subjected to five stages of boiling process, there was recovered 2,650g of sucrose as already indicated in Example 1. Similarly, 210g of sucrose could be recovered by boiling 700g of the fourth molasses.

The foregoing results indicates that the yield of sucrose could be increased by 36g when 700g of fourth molasses was acted upon by $\alpha$-galactosidase to have the raffinose therein hydrolyzed and then the hydrolized molasses was returned to a process preceding the deionization process using ion-exchange resins.

This increase of sucrose yield is noted to far exceed 16.0g of sucrose which was formed in consequency of the hydrolysis of raffinose by $\alpha$-galactosidase.

Example 3

As the source of $\alpha$-galactosidase, there were used the same enzyme-containing cells as descibed in Example 1. The molasses selected for the hydrolysis was that which was obtained in a plant wherein the sugar-boiling process was not preceded by the deionization process using ion-exchange resins. This molasses had a composition as shown in Table 14 below.

TABLE 14

| | |
|---|---|
| Brix concentration | 79.5° Brix |
| Sucrose concentration | 84.2% on Brix |
| Raffinose concentration | 6.20% on Brix |
| Invert sugar concentration | 0.95% on Brix |
| S. C. V. | 32 |

20 kg of the molasses of the aforesaid composition was diluted with water to 30° Brix and adjusted to pH 5.0 with sulfuric acid. To the molasses thus prepared, the enzyme-containing cells (having 600,000 units of $\alpha$-galactosidase potency per gram) were added in an amount such as to give 4,500,000 units of $\alpha$-galactosidase potency per gram of raffinose. The mixture was agitated at 50° C for 3 hours to allow the enzyme to act upon the raffinose in the molasses. The raffinose-hydrolyzed molasses obtained after removal of the enzyme-containing cells by filtration was found to have a composition as shown in Table 15 below. The hydrolysis ratio of raffinose was found to have reached 77.4 percent. The raffinose-hydrolyzed molasses weighed 53.0 kg.

TABLE 15

| | |
|---|---|
| Brix concentration | 30° Brix |
| Sucrose concentration | 87.2% on Brix |
| Raffinose concentration | 1.40% on Brix |
| Invert sugar concentration | 2.80% on Brix |
| S. C. V. | 46 |

The Brix concentration of sugar solutions was determined with a refractometer, the concentration of sucrose and that of raffinose by thin-layer chromatography, the invert sugar concentration by the modified Somogyi method, and the Stammer color value with a Stammer colorimeter.

When this raffinose-hydrolyzed molasses was purified by deionizing with ion-exchange resins, it assumed a composition as shown in Table 16 below.

TABLE 16

| | |
|---|---|
| Brix concentration | 21° Brix |
| Sucrose concentration | 91.4% on Brix |
| Raffinose concentration | 1.50% on Brix |
| Invert sugar concentration | 3.55% on Brix |
| S. C. V. | 8 |

The deionization was effected by using ion-exchange resins, Amberlite IR-120B (H type) and Amberlite IRA-68 (OH type), with the regeneration level fixed at 20g of NaOH per liter of resin and 85g of $H_2SO_4$ per liter of resin for IR-120B and 60g of NaOH per liter of resin for IRA-68. The passage through the column was made at a speed of SV 2 (SV standing for spacial velocity) and a temperature of 7° C. Consequently, there was obtained 70.9 kg of sugar solution. When the entire sugar solution (70.9 kg) was mixed with 200 kg of diffusion juice having the composition of Table 17, there was obtained 270.9 kg of mixed sugar solution having a composition as shown in Table 18.

TABLE 17

| | |
|---|---|
| Brix concentration | 15.8° Brix |
| Sucrose concentration | 89.2% on Brix |
| Raffinose concentration | 0.95% on Brix |
| Invert sugar concentration | 0.75% on Brix |

TABLE 18

| | |
|---|---|
| Brix concentration | 17.2° Brix |
| Sucrose concentration | 89.8% on Brix |
| Raffinose concentration | 1.10% on Brix |
| Invert sugar concentration | 1.65% on Brix |

The diffusion juice used in this mixture was that which had been obtained by slicing beets and steeping them in hot water at 68° to 72° C in a diffuser.

This mixed sugar solution was carbonated at 80° C with milk of lime which was added in an amount of 2.0 percent on Brix scale as CaO. Then, it was filtered. The filtered carbonated solution was found to have a composition as shown in Table 19. It weighed 296.6 kg.

TABLE 19

| | |
|---|---|
| Brix concentration | 15.1° Brix |
| Sucrose concentration | 93.0% on Brix |
| Raffinose concentration | 1.15% on Brix |
| Invert sugar concentration | 0.30% on Brix |
| S. C. V. | 4 |

When 20 kg of the same molasses was diluted with water to 30° Brix for the purpose of deionization with ion-exchange resins and then deionized with IR-120B and IRA-68 under the same conditions as mentioned above, the deionized molasses was found to have a composition as shown in Table 20. It weighed 73.9 kg. When the entire molasses thus prepared was mixed with 200 kg of diffusion juice (having the same composition as shown in Table 17), the resultant sugar solution had a composition as given in Table 21. This solution weighed 273.9 kg.

TABLE 20

| | |
|---|---|
| Brix concentration | 20.5° Brix |
| Sucrose concentration | 87.4% on Brix |
| Raffinose concentration | 6.50% on Brix |
| Invert sugar concentration | 1.59% on Brix |
| S. C. V. | 8 |

TABLE 21

| | |
|---|---|
| Brix concentration | 17.1° Brix |
| Sucrose concentration | 88.60% on Brix |
| Raffinose concentration | 2.75% on Brix |
| Invert sugar concentration | 1.03% on Brix |

The mixed sugar solution having the composition of Table 21 was carbonated at 80° C with milk of lime which was added in an amount of 2 percent (Brix scale) as CaO. The resultant carbonated solution was found to have a composition as shown in Table 22. It weighed 304.0 kg.

TABLE 22

| | |
|---|---|
| Brix concentration | 15.0° Brix |
| Sucrose concentration | 90.6% on Brix |
| Raffinose concentration | 2.82% on Brix |
| Invert sugar concentration | 0.22% on Brix |
| S. C. V. | 4 |

The entire sugar solution of the composition of Table 19 and that of the composition of Table 22 which were each derived from 20 kg of molasses and 200 kg of diffusion juice were subjected to sugar-boiling process, with the result that the former solution afforded 37.9 kg of sucrose and the latter solution 36.0 kg of sucrose respectively. The results indicate that the sucrose recovered was 1.9 kg greater when 20 kg of molasses was acted upon by $\alpha$-galactosidase, deionized with ion exchange resins, mixed with the diffusion juice and carbonated according to the present Example. This increase is noted to far exceed 0.52 kg of sucrose which was formed in consequence of the hydrolysis of raffinose by $\alpha$-galactosidase.

The product sugar obtained by using the molasses of the composition of Table 22 consisted of very slender sucrose crystals and appeared to be markedly inferior to the product sugar obtained by using the molasses of the composition of Table 19. The Stammer color value of waste molasses was 190 in the case of the sugar solution having the composition of Table 19 and 310 in the case of the sugar solution having the composition of Table 22. This suggests that the coloration due to the heat applied in the sugar-boiling process was heavier in the latter solution.

According to the present Example, the amount of sucrose recovered was 1.9 kg, a value far exceeding the value 0.52 kg of sucrose formed in consequence of the hydrolysis of raffinose.

Example 4

The molasses used here had the composition given in Table 23.

TABLE 23

| | |
|---|---|
| Brix concentration | 80.4° Brix |
| Sucrose concentration | 74.5% on Brix |
| Raffinose concentration | 8.9% on Brix |
| Invert sugar concentration | 1.4% on Brix |
| S. C. V. | 110 |

20 kg of this molasses was diluted with water to 30° Brix and adjusted to pH 5.2. To the molasses thus prepared, the same enzyme-containing cells as described in Example 1 were added in an amount such as to give 4,500,000 units of α-galactosidase potency per gram of raffinose. The mixture was treated at 50° C for 2.5 hours so as to cause the raffinose contained therein to be hydrolyzed. The raffinose-hydrolyzed molasses from which the enzyme-containing cells were removed by filtration was found to have a composition as shown in Table 24 below. The raffinose-hydrolyzed molasses weighed 53.6 kg and the hydrolysis ratio was 71.9 percent.

TABLE 24

| | |
|---|---|
| Brix concentration | 30° Brix |
| Sucrose concentration | 78.0% on Brix |
| Raffinose concentration | 2.5% on Brix |
| Invert sugar concentration | 3.9% on Brix |
| S. C. V. | 132 |

The molasses obtained in consequence of the hydrolysis of raffinose was cooled to 7° C and deionized by the treatment with ion-exchange resins, Amberlite IR-120B (H type) and IRA-68 (OH type) by following the procedure of Example 3. The sugar solution thus obtained was found to have a composition as shown in Table 25 and to weigh 77.9 kg.

TABLE 25

| | |
|---|---|
| Brix concentration | 19.4° Brix |
| Sucrose concentration | 83.2% on Brix |
| Raffinose concentration | 2.7% on Brix |
| Invert sugar concentration | 4.2% on Brix |
| S. C. V. | 18 |

The deionized molasses, 77.9 kg, mentioned above was mixed with 250 kg of the sugar solution (of the composition of Table 26) obtained by carbonating the diffusion juice. The resultant mixed solution had a composition as shown in Table 27 and weighed 327.9 kg.

TABLE 26

| | |
|---|---|
| Brix concentration | 12.5° Brix |
| Sucrose concentration | 91.0% on Brix |
| Raffinose concentraton | 1.0% on Brix |
| Invert sugar concentration | 0.16% on Brix |
| S. C. V. | 6 |

TABLE 27

| | |
|---|---|
| Brix concentration | 14.1° Brix |
| Sucrose concentration | 87.8% on Brix |
| Raffinose concentration | 1.6% on Brix |
| Invert sugar concentration | 1.45% on Brix |
| S. C. V. | 10 |

Separately, the molasses of the composition of Table 23 was diluted to 30° Brix without being subjected in advance to raffinose hydrolysis and then deionized with ion-exchange resins. The resultant molasses was found to have a composition as shown in Table 28 and to weigh 72.8 kg.

TABLE 28

| | |
|---|---|
| Brix concentration | 20.2° Brix |
| Sucrose concentration | 79.6% on Brix |
| Raffinose concentration | 9.7% on Brix |
| Invert sugar concentration | 2.05% on Brix |
| S. C. V. | 13 |

When the entire sugar solution having composition of Table 28 was mixed with 250 kg of carbonated diffusion juice, the resultant mixed solution had a composition as shown in Table 29, below and weighed 322.8 kg.

TABLE 29

| | |
|---|---|
| Brix concentration | 14.2° Brix |
| Sucrose concentration | 87.3% on Brix |
| Raffinose concentration | 3.8% on Brix |
| Invert sugar concentration | 0.76% on Brix |

The sugar solution of Table 27 and that of Table 29 were subjected to sugar-boiling process to recover sucrose. Consequently, 34.2 kg of sucrose was recovered from the former solution and 32.9 kg of sucrose from the latter solution. Thus, the results indicate that there was an increase of 1.3 kg in the sucrose yield from 20 kg of molasses. This increase, 1.3 kg, far exceeded 0.70 kg of sucrose formed in consequence of the hydrolysis of raffinose by α-galactosidase.

The sucrose purity in the waste molasses was 53.8 percent in the case of solution of Table 27 and 57.0 percent in the case of the solution of Table 29. This indicates that the sucrose quantity entrained by the waste molasses was smaller when the molasses was treated with α-galactosidase.

The product sugar obtained from the sugar solution of Table 27 had a purity of 99.9 percent and showed good quality with an improved form of crystals. By contrast, the product sugar from the sugar solution of Table 29 had a purity of 98.8 percent and showed poor quality with slender crystals.

The Stammer color value was 0.15 in the case of sugar obtained from the sugar solution of Table 27, while it was 0.8 in the case of sugar produced from the sugar solution of Table 29. Thus, the latter sugar appeared to be markedly inferior in commercial value.

The Stammer color value was 380 in the case of the waste molasses separated from the sugar solution of Table 27 had 440 in the case of the waste molasses from the sugar solution of Table 29.

Example 5

This example represents a case in which the molasses was deionized with ion-exchange resins prior to the process of raffinose hydrolysis and the molasses thus treated was subsequently returned to a process preceding the carbonation process.

First, 20 kg of molasses was diluted to 30° Brix and then deionized at 5° C with ion-exchange resins, such as of Amberlite IR-120B (H type) and IRA-68 (OH type).

The molasses and the deionized sugar solution had compositions as shown in Table 30 and Table 31 respectively.

TABLE 30

| | |
|---|---|
| Brix concentration | 80.4° Brix |
| Sucrose concentration | 72.8% on Brix |
| Raffinose concentration | 9.4% on Brix |
| Invert sugar concentration | 1.8% on Brix |
| S. C. V. | 118 |

TABLE 31

| | |
|---|---|
| Brix concentration | 21.4° Brix |
| Sucrose concentration | 78.0% on Brix |
| Raffinose concentration | 10.3% on Brix |
| Invert sugar concentration | 2.7% on Brix |
| S. C. V. | 10 |

The solution obtained in consequence of the deionization treatment with ion-exchange resins weighed 68.6 kg.

To the entire molasses of the composition of Table 31 obtained after the deionization treatment with ion-exchange resins, the enzyme-containing cells (the same α-galactosidase source as described in Example 1) were added in an amount such as to give 3,500,000 units of potency per gram of raffinose. The mixture, pH 5.2, was agitated at 50° C for 2.5 hours to allow the raffinose therein to be hydrolyzed. The molasses obtained after the removal by filtration of enzyme-containing cells therefrom was found to have a composition as shown in Table 32 and to weigh 68.3kg. The hydrolysis ratio was 61.2 percent.

TABLE 32

| | |
|---|---|
| Brix concentration | 21.4° Brix |
| Sucrose concentration | 82.2% on Brix |
| Raffinose concentration | 4.0% on Brix |
| Invert sugar concentration | 5.82% on Brix |
| S. C. V. | 16 |

The mixture of 250 kg of diffusion juice (having the composition of table 33) with 68.6 kg of the aforesaid deionized molasses and the mixture of the diffusion juice with the aforesaid raffinose-hydrolyzed molasses had compositions as shown in Table 34 and Table 35 respectively. They were found to weigh 318.6 kg and 318.3 kg respectively.

TABLE 33

| | |
|---|---|
| Brix concentration | 15.4° Brix |
| Sucrose concentration | 88.6% on Brix |
| Raffinose concentration | 0.8% on Brix |
| Invert sugar concentration | 0.8% on Brix |

TABLE 34

| | |
|---|---|
| Brix concentration | 16.7° Brix |
| Sucrose concentration | 85.6% on Brix |
| Raffinose concentration | 3.42% on Brix |
| Invert sugar concentration | 1.3% on Brix |

TABLE 35

| | |
|---|---|
| Brix concentration | 16.7° Brix |
| Sucrose concentration | 86.7% on Brix |
| Raffinose concentration | 1.7% on Brix |
| Invert sugar concentration | 2.2% on Brix |

When the sugar solution of Table 34 and that of Table 35 were carbonated by following the procedure of Example 3, the solutions thus carbonated and subsequently filtered were found to have compositions as shown in Table 36 and Table 37 and to weigh 351.3 kg and 350.7 kg respectively.

TABLE 36

| | |
|---|---|
| Brix concentration | 14.6° Brix |
| Sucrose concentration | 87.6% on Brix |
| Raffinose concentration | 3.65% on Brix |
| Invert sugar concentration | 0.20% on Brix |
| S. C. V. | 7 |

TABLE 37

| | |
|---|---|
| Brix concentration | 14.6° Brix |
| Sucrose concentration | 88.7% on Brix |
| Raffinose concentration | 1.79% on Brix |
| Invert sugar concentration | 0.25% on Brix |
| S. C. V. | 8 |

The entire sugar solution of Table 36 and that of Table 37 were sugjected to the sugar-boiling process to recover sucrose. Consequently, there were recovered 36.7 kg of sucrose from the former solution and 38.8 kg of sucrose from the latter solution. This indicates that the procedure of this example, brought about an increase of 2.1 kg in the yield of sucrose from 20 kg of molasses. This increase far exceeded 0.63 kg of sucrose formed in consequence of the hydrolysis of raffinose by α-galactosidase.

The sucrose purity in the waste molasses was 56.5 percent in the molasses separated from the sugar solution of Table 36 and 53.2 percent in the molasses separated from that of Table 37. This indicates that the sucrose quantity entrained by the waste molasses was smaller when the molasses was acted upon by α-galactosidase.

The product sugar obtained from the sugar solution of Table 37 had a purity of 99.9 percent, while the product sugar from the sugar solution of Table 36 had a purity of 98.8 percent and showed inferior quality with slender crystals. The Stammer color value was 0.15 in the sugar obtained from the sugar solution of Table 37 and 0.8 in the sugar produced from the sugar solution of Table 36. Thus, the latter sugar had markedly inferior commercial value to the former sugar.

The Stammer value was 420 in the waste molasses separated from the sugar solution of Table 37 and 320 in that separated from the sugar solution of Table 36 respectively.

What is claimed is:

1. In a method for producing sucrose from beets involving the deionization process using ion-exchange resins prior to the sugar-boiling process, the improvement for increasing the yield of sucrose which comprises the steps of allowing α-galactosidase to react upon the molasses separated in the centrifugal process from the massecuite resulting from the sugar-boiling process thereby hyrolyzing the raffinose in the molasses into sucrose and galactose and returning the resultant hydrolyzate to the purification process primarily designed for fresh diffusion juice.

2. In a method for producing sucrose from beets involving the deionization process using ion-exchange resins subsequent to the sugar-boiling process, the improvement for increasing the yield of sucrose which comprises the steps of allowing α-galactosidase to react upon the molasses separated in the centrifugal process from the massecuite resulting from the sugar-boiling process thereby hydrolyzing the raffinose in the molasses into sucrose and galactose, subjecting the resultant hydrolyzate to the deionization process using ion-exchange resins, and thereafter returning the deionized hydrolyzate to the purification process primarily designed for fresh diffusion juice.

3. In a method for producing sucrose from beets involving the deionization process using ion-exchange resins subsequent to the sugar-boiling process, the improvement for increasing the yield of sucrose which comprises the steps of subjecting to the deionization process using ion-exchange resins the molasses separated in the centrifugal process from the massecuite resulting from the sugar-boiling process, allowing α-galactosidase to react upon the deionized molasses thereby hydrolyzing the raffinose in the molasses into sucrose and galactose, and subsequently returning the hydrolyzate to the purification process primarily designed for fresh diffusion juice.

4. The method of claim 1 wherein hydrolyzing of the raffinose in the molasses is effected in a molasses concentration of 20°–60° Brix, a temperature of 45°–55° C. and a pH of 5–5.2.

5. The method of claim 2 wherein hydrolyzing of the raffinose in the molasses is effected in a molasses concentration of 20°–60° Brix, a temperature of 45°–55° C. and a pH of 5–5.2.

6. The method of claim 3 wherein hydrolyzing of the raffinose in the molasses is effected in a molasses concentration of 20°–60° Brix, a temperature of 45°–55° C and a pH of 5–5.2.

* * * * *

UNITED STATES PATENT OFFICE
CERTIFICATE OF CORRECTION

Patent No. 3,767,526                           Dated Oct. 23, 1973

Inventor(s) Hideo Suzuki et al

It is certified that error appears in the above-identified patent and that said Letters Patent are hereby corrected as shown below:

In the heading, between items (21) and (52), insert:--

(30)    Foreign Applications Priority Data
       Dec. 5, 1970    Japan....................107,789/70
       Dec. 25, 1970   Japan....................128,413/70

Signed and sealed this 16th day of July 1974.

(SEAL)
Attest:

McCOY M. GIBSON, JR.                         C. MARSHALL DANN
Attesting Officer                            Commissioner of Patents

UNITED STATES PATENT OFFICE
CERTIFICATE OF CORRECTION

Patent No. 3,767,526      Dated Oct. 23, 1973

Inventor(s) Hideo Suzuki et al

It is certified that error appears in the above-identified patent and that said Letters Patent are hereby corrected as shown below:

In the heading, at [73], insert --Sugar-- between "Hokkaido" and "Co."

Signed and sealed this 1st day of April 1975.

(SEAL)
Attest:

RUTH C. MASON
Attesting Officer

C. MARSHALL DANN
Commissioner of Patents
and Trademarks